(12) United States Patent
Harris

(10) Patent No.: US 11,503,887 B2
(45) Date of Patent: Nov. 22, 2022

(54) MOBILE CARRIER CANOPY ASSEMBLY

(71) Applicant: Tyanna Harris, Orange, NJ (US)

(72) Inventor: Tyanna Harris, Orange, NJ (US)

( * ) Notice: Subject to any disclaimer, the term of this patent is extended or adjusted under 35 U.S.C. 154(b) by 0 days.

(21) Appl. No.: 17/168,495

(22) Filed: Feb. 5, 2021

(65) Prior Publication Data

US 2022/0248818 A1 Aug. 11, 2022

(51) Int. Cl.
| | |
|---|---|
| A45B 11/00 | (2006.01) |
| A45B 25/12 | (2006.01) |
| A45B 19/04 | (2006.01) |
| A45B 23/00 | (2006.01) |
| A45B 19/08 | (2006.01) |

(52) U.S. Cl.
CPC .............. *A45B 25/12* (2013.01); *A45B 19/04* (2013.01); *A45B 19/08* (2013.01); *A45B 2023/0006* (2013.01); *A45B 2200/1054* (2013.01)

(58) Field of Classification Search
CPC . A45B 11/00; A45B 2023/0093; A45B 24/24; A45B 25/26; A45B 2200/1009; A45B 2200/1054
USPC ..................................... 135/88.02, 88.04, 16
See application file for complete search history.

(56) References Cited

U.S. PATENT DOCUMENTS

| | | | | |
|---|---|---|---|---|
| 5,529,368 A * | 6/1996 | Cui | ..................... | A45B 11/00 135/16 |
| 6,213,137 B1 * | 4/2001 | Wang | ..................... | B60R 7/12 135/16 |
| 7,631,654 B2 * | 12/2009 | Blumenthal | ........... | A45B 11/00 135/20.1 |
| 7,690,389 B2 * | 4/2010 | Barreiro | ................... | A61G 5/10 135/88.01 |
| 8,210,193 B2 * | 7/2012 | Ortiz | ..................... | B62B 5/0013 135/88.04 |
| 8,479,962 B2 * | 7/2013 | Hall | ........................ | B60R 11/00 224/482 |
| 9,649,235 B1 * | 5/2017 | McComb-Jones | ....... | A47C 7/66 |
| 10,099,542 B2 * | 10/2018 | Teague | ................... | B60R 11/00 |
| 2006/0289044 A1 * | 12/2006 | Benett | ..................... | B62B 9/147 135/16 |
| 2012/0048316 A1 * | 3/2012 | Fournillier | ............. | A45B 17/00 135/16 |

* cited by examiner

*Primary Examiner* — Noah Chandler Hawk
(74) *Attorney, Agent, or Firm* — William Alonzo Stanback PC

(57) ABSTRACT

The invention is an umbrella-like canopy assembly and the container in which it can be stored. The resulting apparatus can be secured to a hand-controlled mobile carrier. The canopy assembly can be moved from a storage position within the container and then opened to cover, in the least, a portion of the container and preferably one or more areas designated by the user of the mobile carrier. With the apparatus secured to the mobile carrier, for instance, the user and also preferably the contents of the carrier can be shield from the sun and other environmental elements (e.g., rain, snow, and wind). The main parts of the apparatus are the canopy assembly, which is attached to the inside of the container, and means for securing the container to the mobile carrier.

18 Claims, 13 Drawing Sheets

MOBILE CARRIER CANOPY ASSEMBLY

FIELD OF INVENTION

The invention relates generally to an apparatus that can be attached to a hand-controlled mobile carrier, with the apparatus containing therein a functional umbrella-like canopy that can be both moved from a storage position within a container of the apparatus and opened to cover, in the least, a portion of the container.

COPYRIGHT NOTICE

A portion of the disclosure of this patent application contains material that is subject to copyright protection. Noting the confidential protection afforded non-provisional patent applications prior to publication, the copyright owner hereby authorizes the U.S. Patent and Trademark Office to reproduce this document and portions thereof prior to publication as necessary for its records. The copyright owner otherwise reserves all copyright rights whatsoever.

BACKGROUND

Umbrellas and other canopies are useful for times when a person needs cover. The cover may be needed for, for example, rainy conditions and other times when the weather and elements warrant. There are also times when an umbrella or other covering might be desired to minimize or eliminate certain exposure to the sun. Handheld umbrellas and appropriately sized canopies allow users to, at times, carry the umbrella-like and other small canopies that can be opened and held by hand. Challenges arise, however, when the user either has a separate use for the user's hands (e.g., pushing a mobile carrier that is preferably controlled by hand, and often times, depending on the configuration of the mobile carrier, by two hands.

SUMMARY

The present invention comprises an apparatus that can be secured to a mobile carrier, where the movement of the mobile carrier is hand controlled by a user. More particularly, the apparatus comprises a container with an upper facing surface and with a canopy assembly cavity. A securing mechanism can be attached to the container, with the mechanism being capable of locking the container in a fixed position in relation to the portion of the mobile carrier. Preferably, the fixed position could be in close proximity to the area of the mobile carrier where the user makes hand contact to control the movement of the mobile carrier. The apparatus further includes an anchoring pole with a first end and a second end. The first end of the pole is connected in proximity to an edge and substantially inside of the canopy assembly cavity by a first hinge. Attached to the second end of the pole is a retractable canopy. This canopy is sized and configurable, when retracted, to fit with the anchoring pole in a storage position within the canopy assembly cavity. The retractable canopy can also be opened to cover at least a portion of the upper facing surface of the container when the combination of the retractable canopy, with the canopy open, and the anchoring pole are moved to at least one coverage position. The coverage positions of the canopy are inclusive of a position where the pole is at a right angle relative to the upper facing surface of the container.

DETAILED DESCRIPTION

Figure 1:
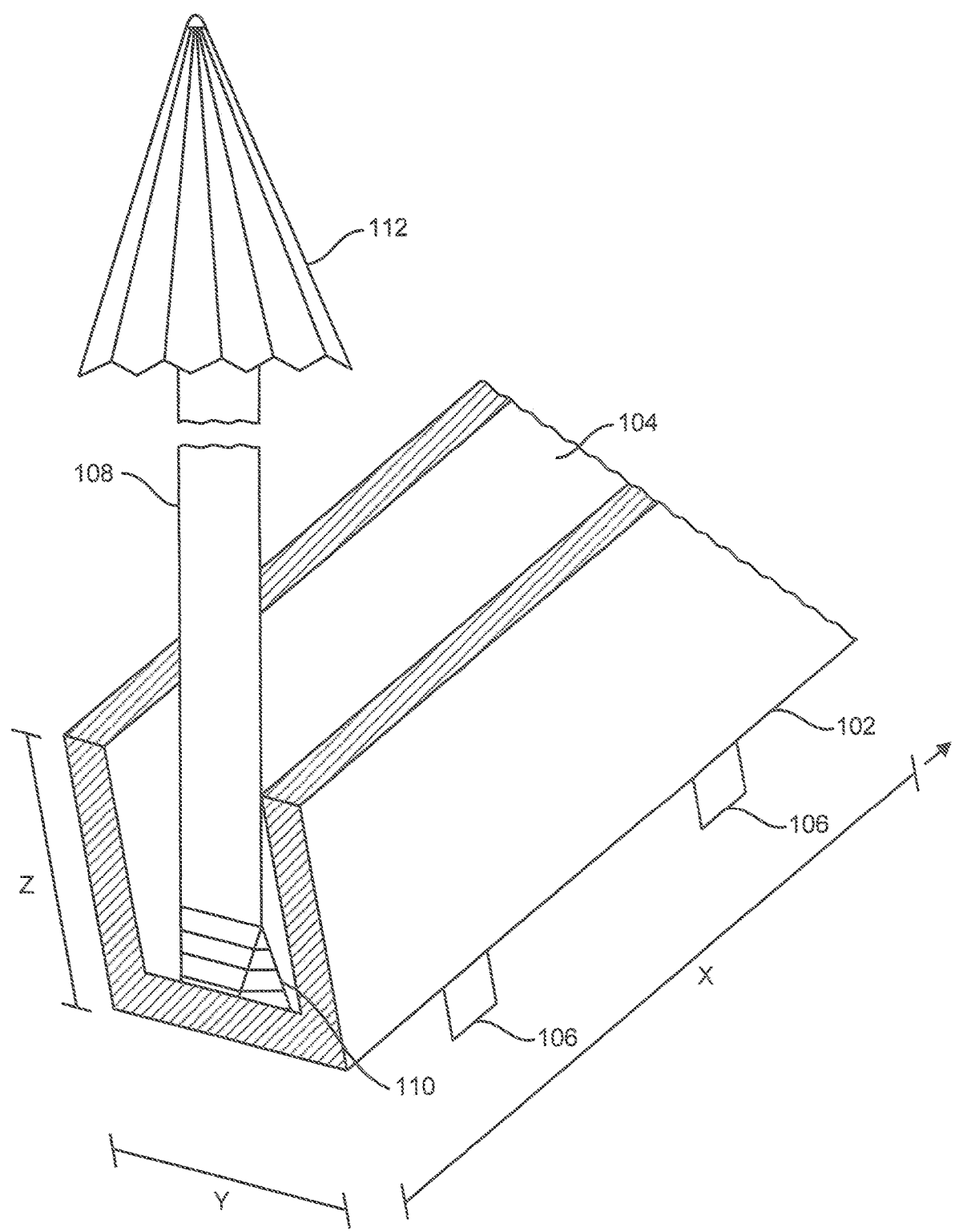
FIG. 1 shows a cross-sectional cut-off view of an embodiment of the present invention, where the pole connecting the closed canopy to the container of the apparatus is depicted only in part.

FIG. 1 shows one embodiment of the inventive apparatus—apparatus 100. In this particular embodiment, apparatus 100, which is sized to be secured to a mobile carrier where the movement of the mobile carrier is hand controlled by a user, has as its main structural element container 102. In the embodiment shown in FIG. 1, container 102 is in the shape of a rectangular box, with four walls and a floor. The length of this particular container 102 along "x", the width along "y" and the height along "z" would be set primarily by the size and configuration of the contents of container 102 and the position of the location(s) at which apparatus 100 would be attached to the applicable mobile carrier. The dimensions of this particular embodiment of apparatus 100, and its rectangular configuration have been selected to help ensure that container 102 can fit conveniently between the handgrips of a child-occupiable stroller (an example of a mobile carrier). The size and configuration could be changed if and as necessary so that the container (A) could take the form of a sphere (one wall) or a multiple wall structure (e.g., walls in the shape of an octagon with a floor), (B) occupy more or less of the space between such handgrips, (C) could have more than one opening, (D) could be secured to the mobile carrier at a different place, (E) be used with a different mobile carrier (e.g., a wheelchair, a golf bag carrier, or a shopping cart) or (D) a combination of the foregoing.

Container 102 also has cavity 104. In the particular embodiment of apparatus 100 shown in FIG. 1, cavity 104 is dimensioned and configured to be a sizable space surrounded by the four outer walls of container 102, with container 102 having a floor as its base. One of ordinary skill in the art would realize that the total volume of cavity 104 would be dictated by, for example, the width of any one or more of the four outer walls, the thickness of the floor and the geometrical configuration of cavity 102. Pertinent to this present invention, however, is for cavity 104 to have the dimensions and be configured to accept within it a canopy assembly (as discussed in more detail below). In this particular embodiment, cavity 104 is accessible through an outward facing opening in the container. One of ordinary skill in the art would realize that there are numerous configurations, sizes, and capacities for container 102 and cavity 104.

Straps 106 are attached to the opposing ends of container 102 and function as a means of securing apparatus 100 to the applicable mobile carrier. As configured in FIG. 1, it is intended that straps 106 be wrapped around opposing poles of, for example, vertical-oriented poles of a child stroller with two poles. One of ordinary skill in the art would realize that straps 106 are mere examples of a securing mechanism. It is preferable that straps 106 be affixed to container 102, but indirect connections may also be workable. From a functional standpoint, it is intended that the applicable securing mechanism be capable of locking the container in a fixed position in relation to the portion of the mobile carrier that is in close proximity to the area of the mobile carrier where the user makes hand contact to control the movement of the mobile carrier. One of ordinary skill in the art would realize that there are a multitude of mechanisms and configurations that could be employed to attach apparatus 100 to the applicable mobile carriers, not just externally extending elements.

Another element of apparatus 100 is anchoring pole 108, with its first end and its second end. One of ordinary skill in the art would realize that anchoring pole 108 or its equivalent could be made of metal, wood, plastic or any other material or combination of materials that suffice for the operability of apparatus 100. In this particular embodiment of the present invention, the first end anchoring pole 108 is connected in proximity to an edge and substantially inside of cavity 104 by first hinge 110. Like anchoring pole 108, first hinge 110 could be made of one or more materials, depending upon the required operational characteristics of apparatus 100.

FIG. 1 also shows retractable canopy 112. In this particular view, retractable canopy 112 is in a closed position. As seen in FIG. 1, retractable canopy 112 is connected to the second end of anchoring pole 108. Also, in this particular embodiment, retractable canopy 112 in its closed position (when retracted) is sized and configurable to fit, with anchoring pole 108, in a storage position within cavity 104. Alternatively, retractable canopy 112 can be opened and cover at least a portion of container 102 when the combination of retractable canopy 112, open, and anchoring pole 108 are moved to at least one coverage position. An example of a coverage position is seen in FIG. 2, where such coverage positions has anchoring pole 202 at a right angle relative to upper facing surface 204 of container 206.

Figure 2:
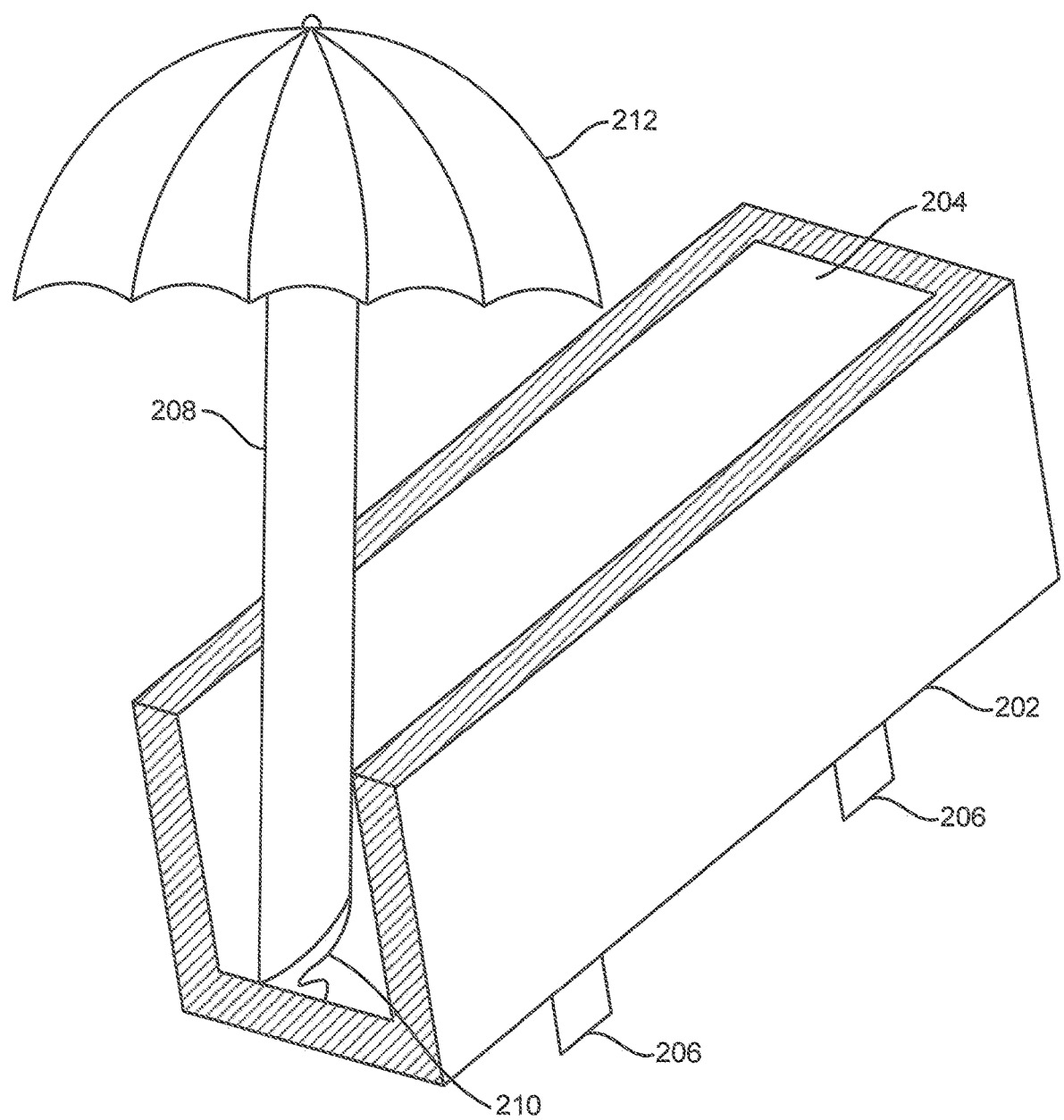
FIG. 2 shows a side view of an embodiment of the present invention shown in FIG. 1, where the pole is positioned at a right angle, with an open canopy, and the pole extends up from the container of the apparatus.

FIG. 2 shows canopy 212 (the open depiction of retractable canopy 112) with a portion of anchoring pole 208 (equivalent to anchoring pole 108). Here, anchoring pole 208 is at a right angle and (perpendicular) to the surface of container 202. Hinge 210 is fully engaged.

Figure 3:
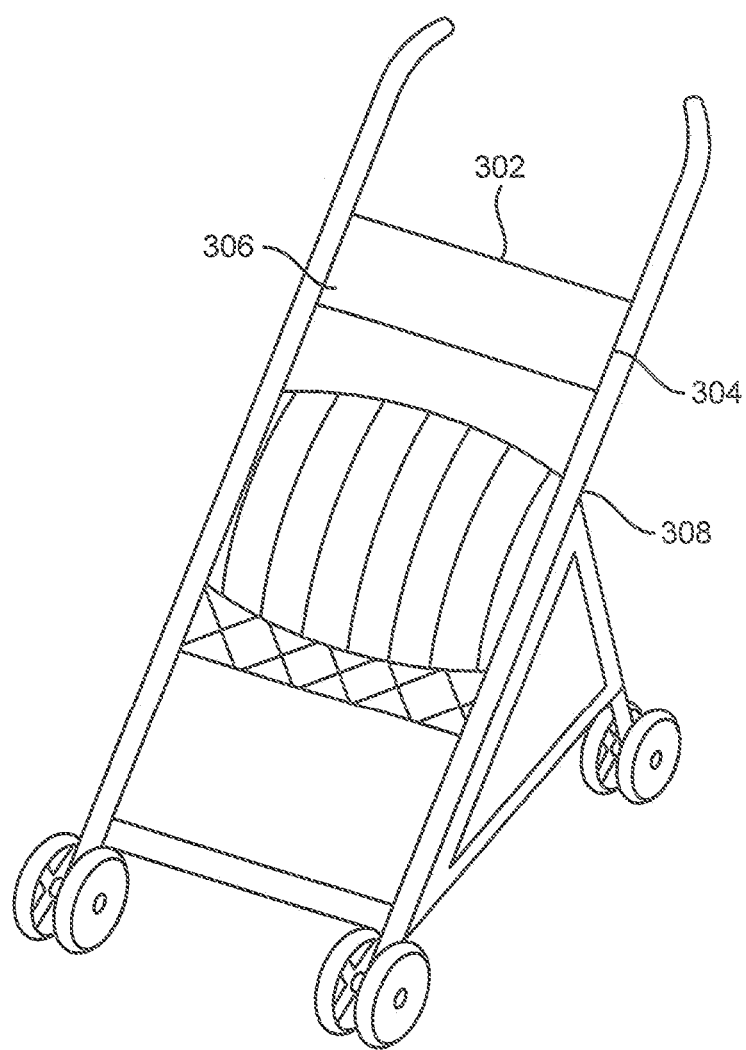
FIG. 3 shows an embodiment of the present invention positioned between the handles of a child's stroller.

In FIG. 3, container 302 of apparatus 300 is sized lengthwise to be no longer than the distance between point 304 and point 306 of the outer edges of the area of mobile carrier 308 (the top, hand-graspable portions of a stroller for the transportation of a child). As shown, this portion of mobile carrier 308 is typically held by two hands and the area in which apparatus 300 is affixed is the space between handles of the stroller. One of ordinary skill would realize that in a similar fashion, the mobile carrier could be a wheelchair and the area of that mobile carrier in which apparatus 300 could be secured could be the space between handles of the wheelchair.

Figure 4:
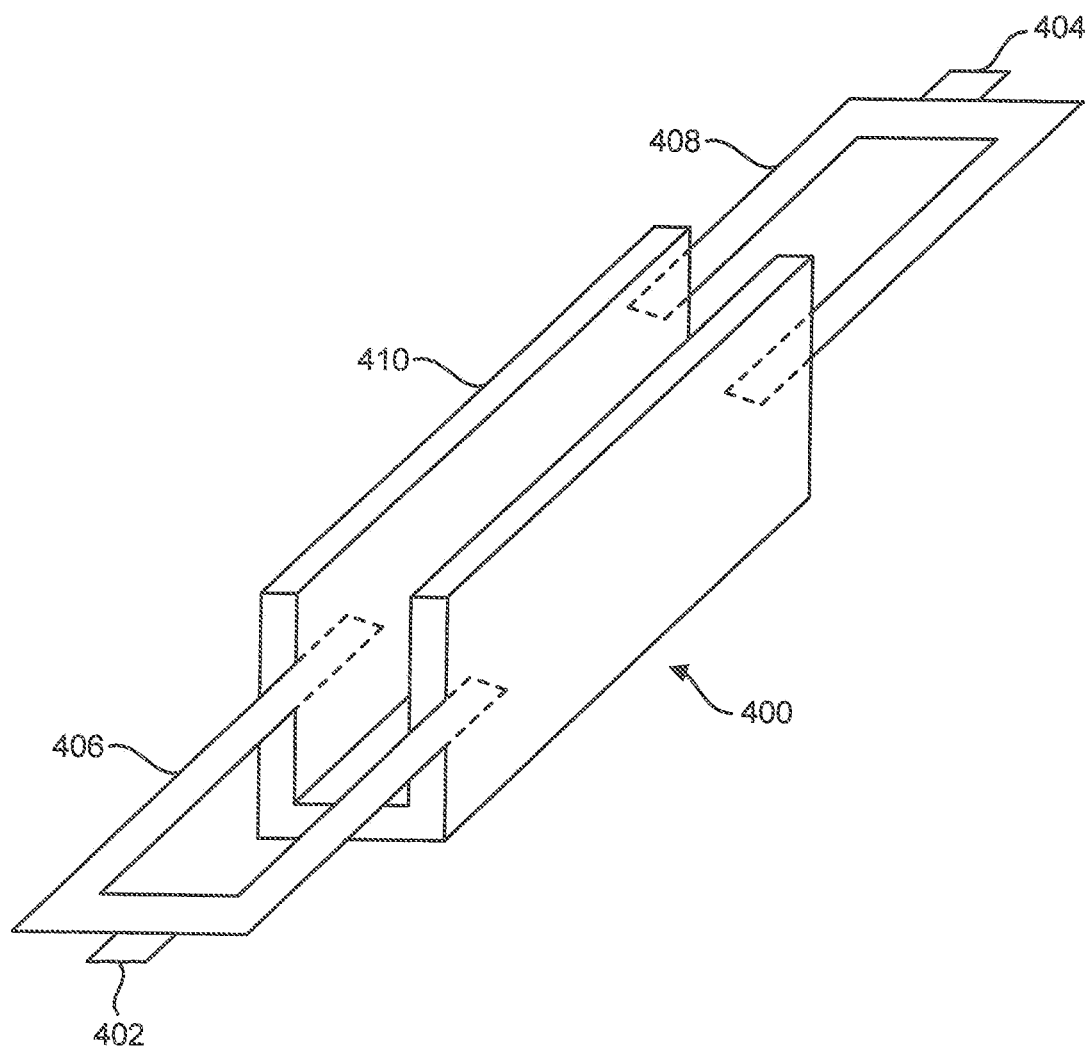
FIG. 4 shows elements of an embodiment of the present invention including a container, extenders, and braces.

In FIG. 4, the present invention is shown as apparatus 400. In this particular embodiment, the securing mechanism for apparatus 400, i.e., the means through which apparatus 400 is attached to a mobile carrier, are brace element 402 and brace element 404. In this embodiment, extender 406 and extender 408 are attached to container 410. The distance between the points of a mobile carrier to which apparatus 400 can be attached can be bridged by lengthening extender 406 and/or extender 408 until corresponding brace element 402 and brace element 404 are desirably positioned to affix apparatus 400 in place relative to the physical connection points of the mobile carrier. Accordingly, although container 410 does not fill the space between the connection points of the main structural element of the mobile carrier, the ends of apparatus 400 is effectively extended to be connectable to the main structural element. In certain instances, it is preferable for the connection points to be near the portion of the mobile carrier that is held by at least one hand. One of ordinary skill in the art would realize that other configurations could be used to, in like fashion, adjustably secure apparatus 400 to the desired mobile carrier.

Figure 5:
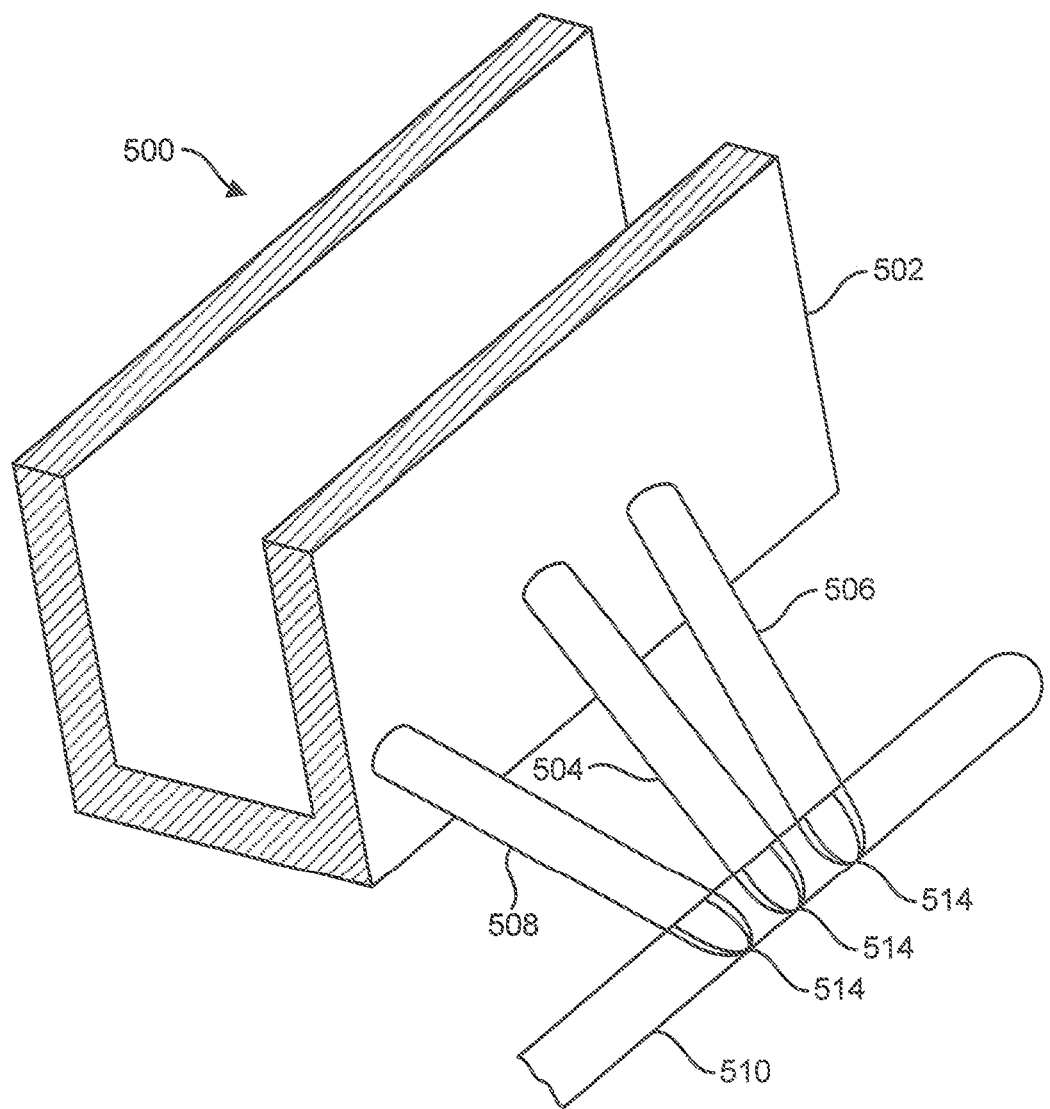
FIG. 5 shows elements of an embodiment of the present invention, including a cross-sectional cut-off view of the container and arms that connect the container to a single handle of a mobile carrier.

FIG. 5 shows an embodiment of the present invention that could be attached to a mobile carrier with one essential structural element, like for example, the singular post of a hand-controlled golf bag cart. Here, apparatus 500 includes container 502, with middle arm 504, arm 506 and arm 508. In this embodiment, an end of middle arm 504 is built into the midsection of container 502 and connects to post 510 of golf bag cart with strap 514. An end of arm 506 is built into container 502 at one end, while a similar end of arm 508 is built into the other end of contain 502. Arm 506 and arm 508 extend from container 502 such that the opposite ends of arm 506 and arm 508 can be physically connected with post 510 by a second and third strap 514. Instead of or in addition to straps 514, apparatus 500 could be secured to post 510 of golf cart by another type of adjustable fasteners. One of ordinary skill in the art would realize that the number and position of the arms, as exemplified in this particular embodiment of the present invention, can be varied for the specifics of the handle or handles to which apparatus 500 could be attached.

Figure 6A:
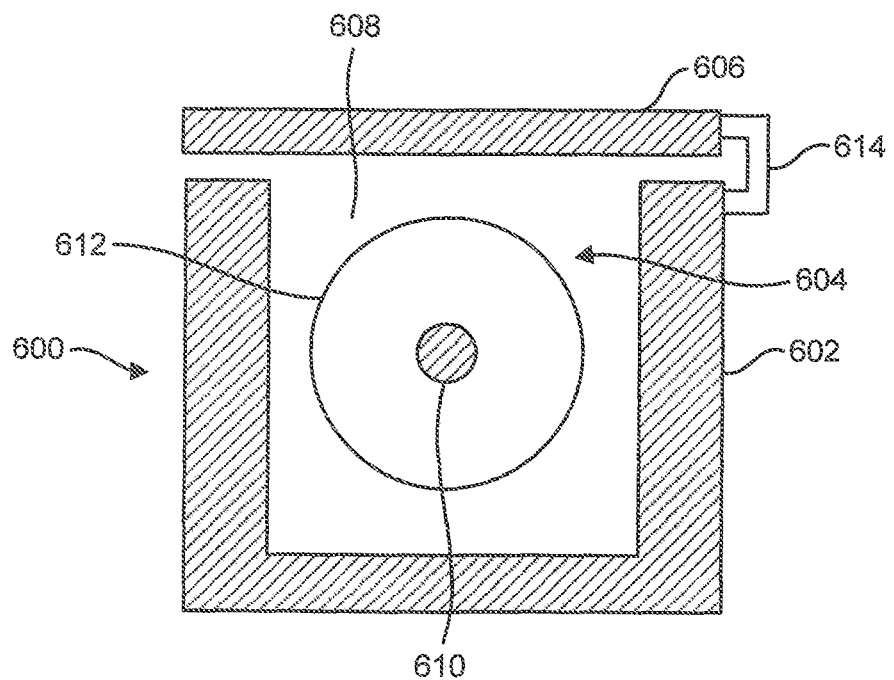
FIG. 6A shows a cross-sectional view of an embodiment of the present invention, with the pole within the closed canopy and the cover for the container closed.
Figure 6B:
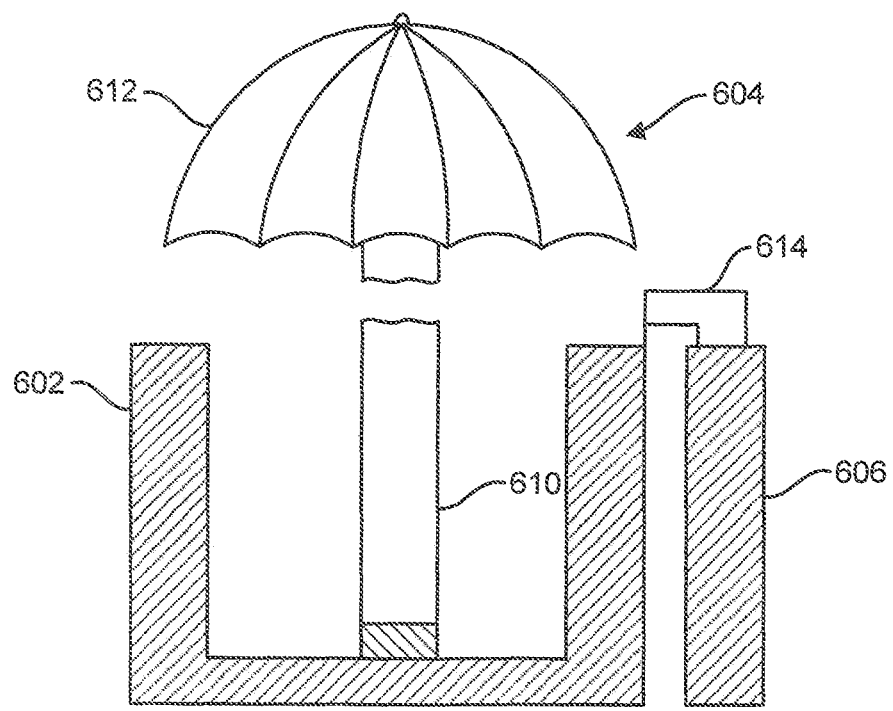
FIG. 6B shows the embodiment of the present invention shown in FIG. 6A, with a similar cross-sectional view of an embodiment of the present invention, with the pole, depicted only in part, connected to the container of the apparatus and to the open canopy (FIG. 6B).
Figure 6C:
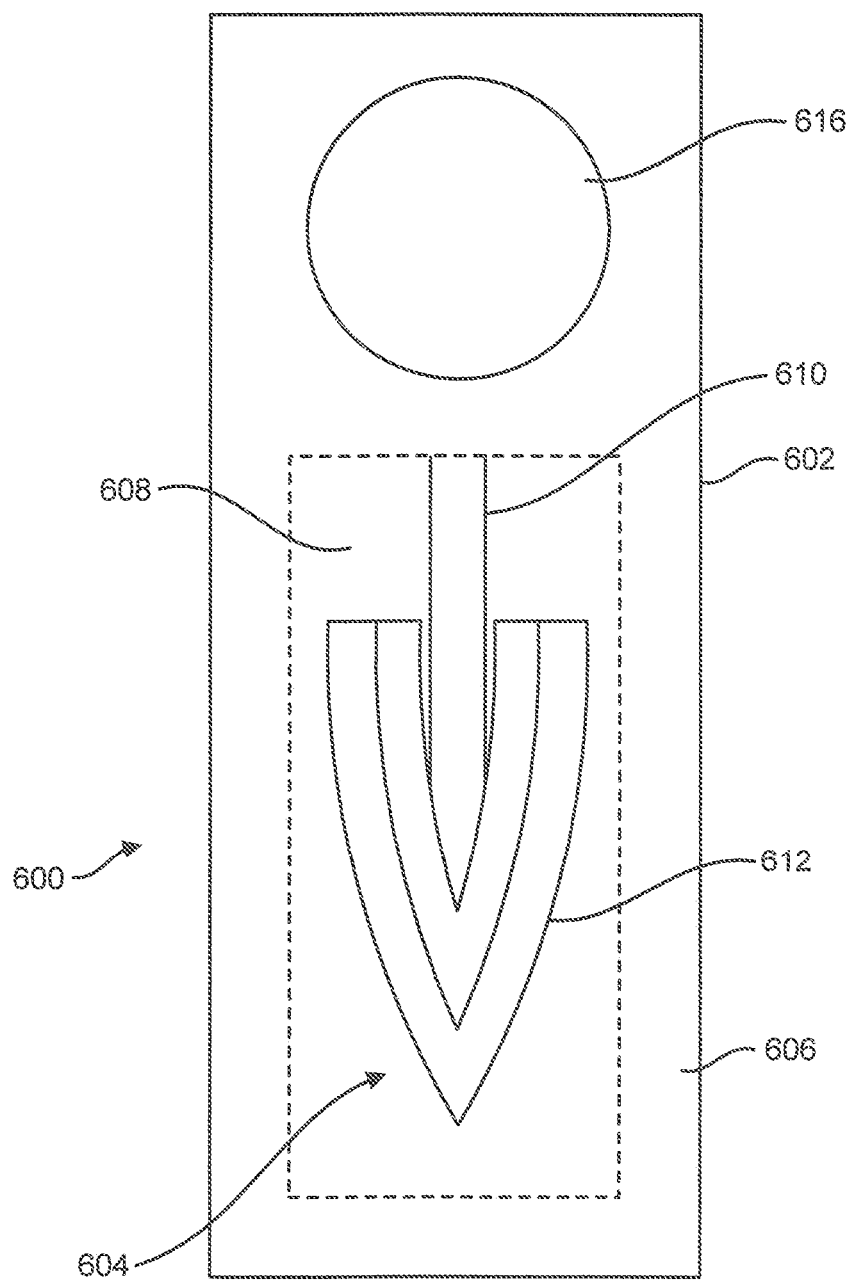
FIG. 6C shows the embodiment of the present invention shown in FIGS. 6A and 6B with a view from the top depicting pole within the closed canopy and both pole and the canopy within the container.

FIG. 6A shows a cross-sectional view of apparatus 600, inclusive of container 602 containing canopy assembly 604 and lid 606. In this particular embodiment, lid 606 is attached to a side of cavity 608. Lid 606 is sized and positioned to cover cavity 608 containing anchoring pole 610 and retractable canopy 612, both of canopy assembly 604. FIG. 6B shows the elements of FIG. 6A, with lid 606 open and canopy assembly 604 out. That is, anchoring pole 610, connected to container 602 by hinge 614, is at a right angle to the length of container 602 and retractable canopy 612 is open. FIG. 6C is a top view of apparatus 600 with lid 606 closed and cup holder cavity 616, positioned in container 602 in a similar fashion as cavity 608, where cup holder cavity 616 is between the inner edge of lid 606 (covering canopy assembly cavity 608) and the outer edge of container 602.

Figure 7:
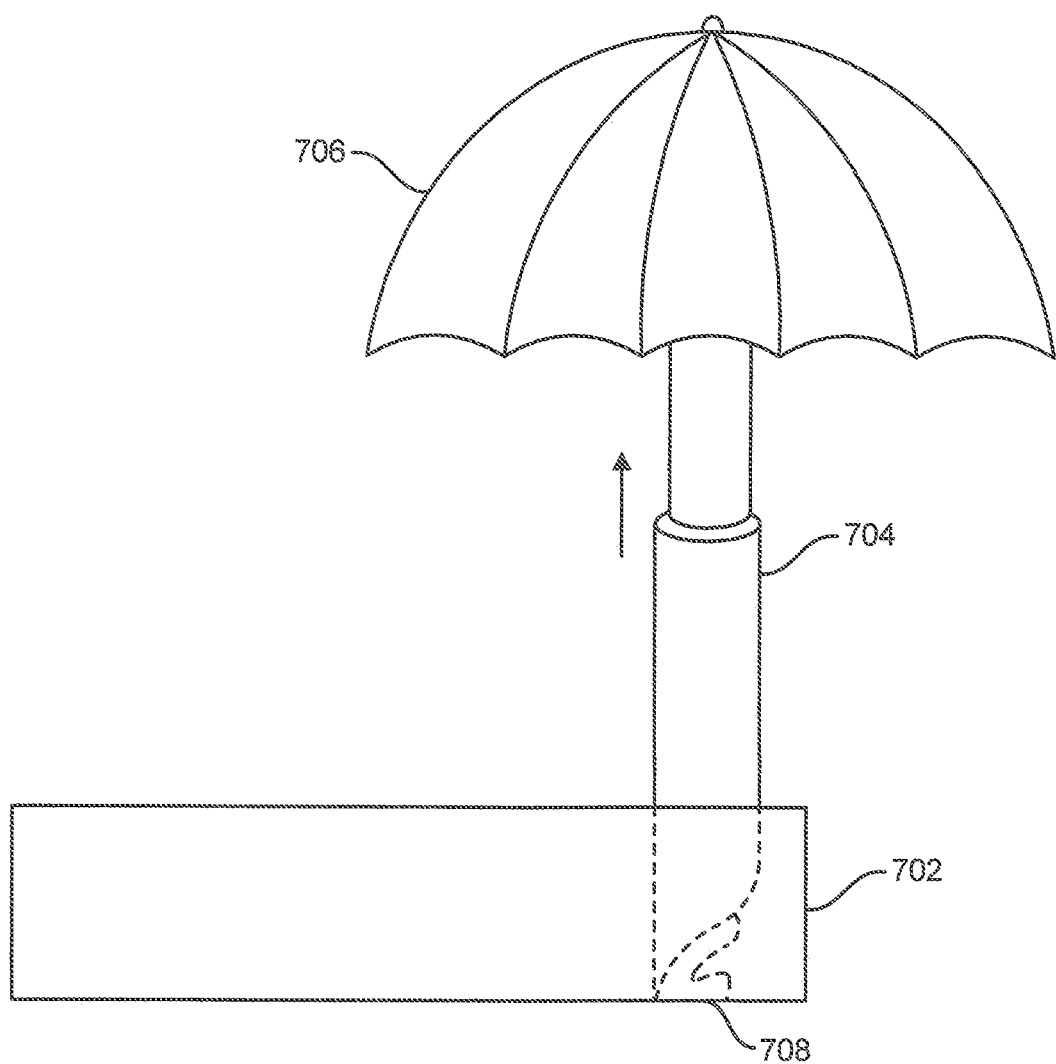
FIG. 7 shows a side view of an embodiment of the present invention with a telescoping pole.

Apparatus 700 of FIG. 7 includes container 702 with telescoping anchoring pole 704. In this embodiment, retractable canopy 706 can be, and is shown as, moved farther away from the upper facing surface of container 702. It can also be moved to a closer position. With one end of anchoring pole 704 supporting retractable canopy 706 in the air, the opposing end of anchoring pole 704 (its first end) is connected to container 702 through hinge 708.

Figure 8A:
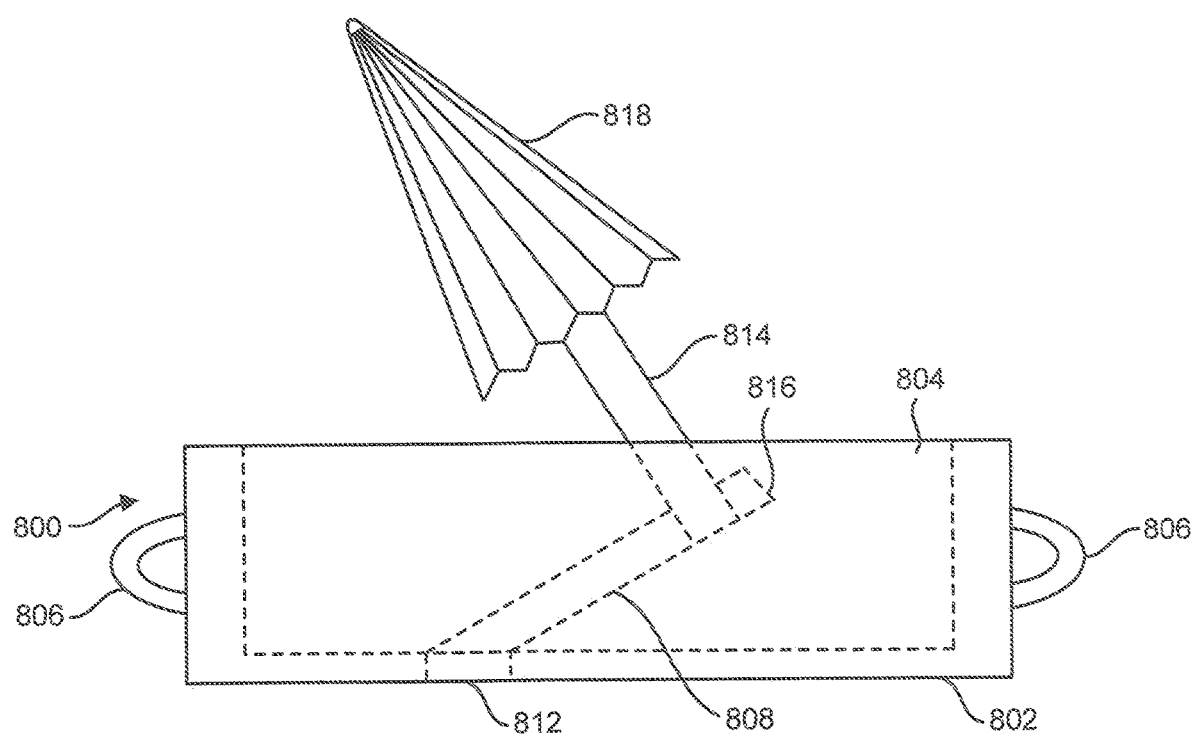
FIG. 8A shows a side view of an embodiment of the present invention with two poles connected to each other, where the other end of the first pole is connected to the container and the other end of the second pole is connected to the canopy.
Figure 8B:
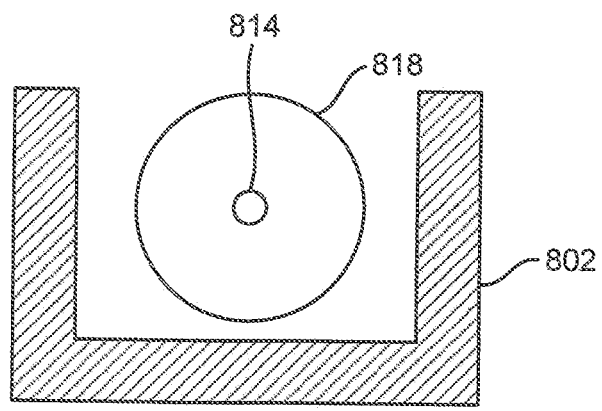
FIG. 8B shows a cross-sectional view of an embodiment of the present invention shown in FIG. 8A, with the pole within the closed canopy and the cover for the container closed.

FIG. 8A shows an exploded view and FIG. 8B shows a cross-sectional view of the present invention with an additional pole element. The embodiment is shown as open in FIG. 8A, and as stored in FIG. 8B. Apparatus 800 is sized to be secured to a mobile carrier, where the movement of the mobile carrier is hand controlled by a user. Container 802 of apparatus 800 has upper facing surface and cavity 804. The elements of securing mechanism 806, in this case, for example, VELCRO straps, are attached to container 802. Securing mechanism 806 is capable of locking container 802 in a fixed position in relation to the portion of a mobile carrier that is in close proximity to the area of the mobile carrier where the user makes hand contact to control the movement of the mobile carrier. Anchoring pole 808 has a first end and a second end. The first end is connected in proximity to an edge and substantially inside of cavity 804 by first hinge 812. Second pole 814 also has a first end and a second end. In this instance, the first end of second pole 814 is connected to the second end of anchoring pole 808 by second hinge 816. Retractable canopy 818 is attached to the second end of second pole 814. Further, retractable canopy 818 is sized and configurable, when retracted, to fit with anchoring pole 808 and second pole 816 in a storage position within cavity 804. Retractable canopy 818 can be opened and cover at least a portion of the upper facing surface of container 802 when the combination of retractable canopy 818, anchoring pole 808 and second pole 814, are configured with retractable canopy 818 in position to be opened. This foregoing combination can be moved to at least one coverage position, with such coverage positions inclusive of a position that is at a right angle relative to the upper facing surface of container 802.

Figure 8C:
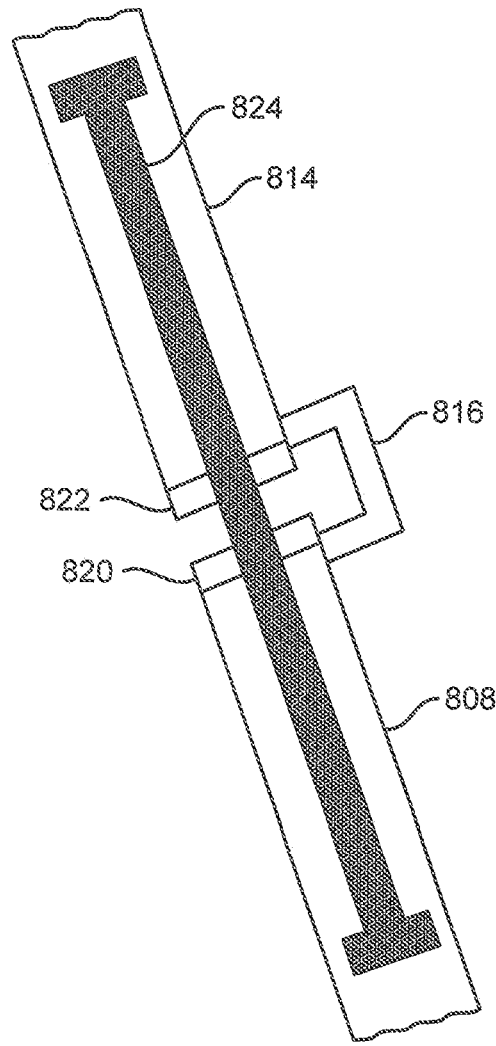
FIG. 8C show the pole elements of the embodiment of the present invention shown in FIGS. 8A and 8B with a hinge connection and an elastic band that connects to the inside of both poles.

The contact surfaces between anchoring pole 808 and second pole 814 should be configured and made of materials that support the alignment of the elements when retractable canopy 818 is removed from cavity 804 and opened to provide the desired coverage. In this particular embodiment of the present invention, second end 820 of anchoring pole 808 and first end 822 of second pole 814 include magnetic material that facilitates locking of the alignment of anchoring pole 808 and second pole 814. For additional stability, as seen in FIG. 8C, at least one elastic band 824 with one end is affixed to anchoring pole 808 and the other end of elastic band 824 is affixed to second pole 814. Such elastic band 824 accommodates the side-by-side storage of anchoring pole 808 and second pole 814 and facilitates maintenance of the alignment of anchoring pole 808 and second pole 814 when they are in a coverage position. In a more specific embodiment of the present invention, elastic band 824 is primarily inside of anchoring pole 808 and second pole 814.

Figure 9A:
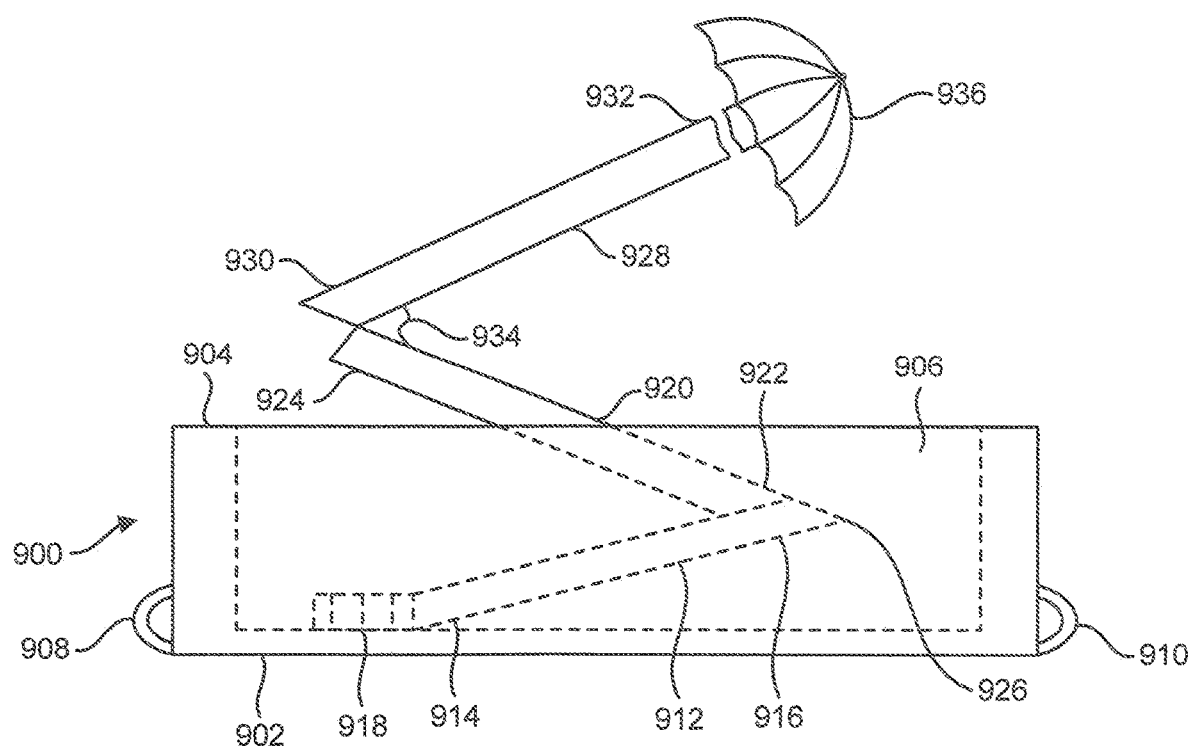
FIG. 9A shows a side view of an embodiment of the present invention with three poles, with the middle pole connected to the other two poles, where the other end of the first pole is connected to the container and the end of the third pole not connected to the middle pole is connected to the canopy.

FIG. 9A shows apparatus 900 which, like the apparatus of some of the other embodiments shown herein, is sized to be secured to a mobile carrier where the movement of the mobile carrier is hand controlled by a user. In this particular embodiment, container 902 has upper facing surface 904 and cavity 906. Securing mechanism is comprised of securing element 908 and securing element 910. Both are attached to container 902 and together are capable of locking container 902 in a fixed position in relation to the portion of the mobile carrier that is in close proximity to the area of the mobile carrier where the user makes hand contact to control the movement of the mobile carrier. Apparatus 900 also includes anchoring pole 912 with first end 914 and second end 916, where first end 914 is connected in proximity to an edge and substantially inside of the cavity 906 by first hinge 918. Second pole 920, with first end 922 and second end 924, where first end 922 of second pole 920 is connected to second end 916 of anchoring pole 912 by second hinge 926. Additionally, in this embodiment, third pole 928 with first end 930 and second end 932, where first end 930 is connected to second end 924 of second pole 920 by third hinge 934.

Retractable canopy 936 is attached to second end 932 of third pole 928, where retractable canopy 936 is sized and configurable, when retracted, to fit with anchoring pole 912, second pole 920, and third pole 928 in a storage position within cavity 906 and where retractable canopy 936 can be opened and cover at least a portion of upper facing surface 904 of container 902 when the combination of retractable canopy 936, anchoring pole 912, second pole 920 and third pole 928, with retractable canopy 936 in position to be opened, are moved to at least one coverage position, with such coverage positions inclusive of a position that is at a right angle relative to upper facing surface 904 of container 902 and where retractable canopy 936 is sized and can be configured to cover, when retractable canopy 936 is opened, a substantial portion of a mobile carrier.

Apparatus 900 is preferably enhanced by the use of magnetic material on or in proximity to second end 916 of anchoring pole 912, first end 922 of second pole 920, second end 924 of second pole 920 and first end 930 of third pole 928. Such use of magnetic material facilitates the locking of the alignment of anchoring pole 912, second pole 920, and third pole 928.

Figure 9B:
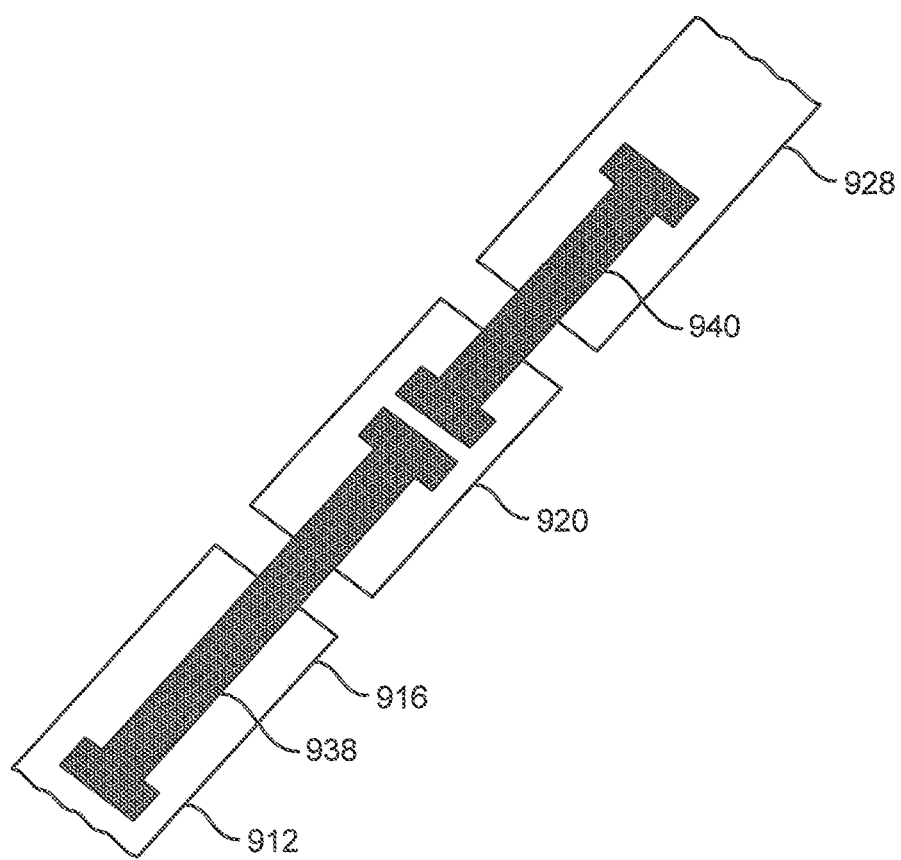
FIG. 9B shows the pole elements of the embodiment of the present invention shown in FIG. 9A with one elastic band connecting the first pole to the second (middle) pole and a second elastic band connecting the second (middle) pole to the third pole.

Similar to the embodiment shown in FIG. 8, the embodiment in FIG. 9B shows apparatus 900 with embedded elastic bands. In this particular embodiment of the present invention, first elastic band 938 is, at one end, affixed to anchoring pole 912. The other end of first elastic band 938 is affixed to second pole 920. Second elastic band 940, at one end, is affixed to second pole 920 and the other end of second elastic band 940 is affixed to third pole 928. In this configuration, the elastic bands accommodate the side-by-side storage of anchoring pole 912, second pole 920, and third pole 928. First elastic band 938 and second elastic band 940 also facilitate maintenance of the alignment of anchoring pole 912, second pole 920, and third pole 928 when they are in a coverage position.

Figure 9C:
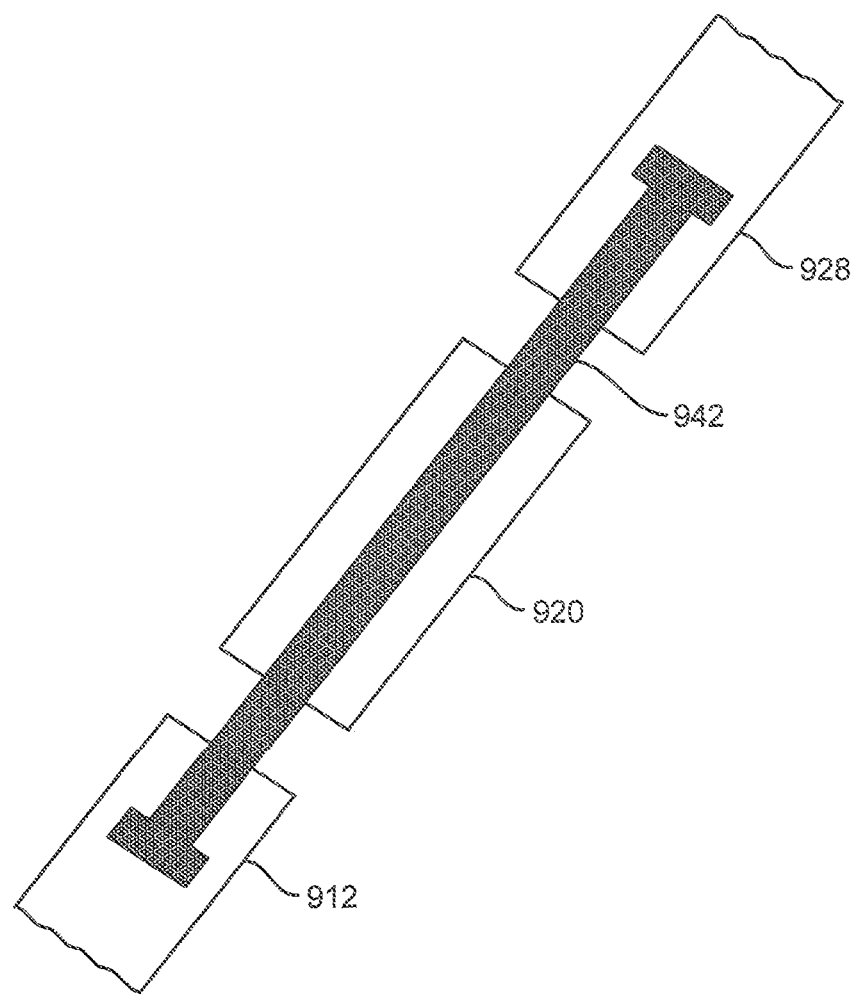
FIG. 9C shows the pole elements of the embodiment of the present invention shown in FIG. 9A with one elastic band connecting the first pole to the third pole, with the elastic band passing through the second (middle) pole.

A variation of the embodiment shown in FIG. 9B is shown in FIG. 9C. Here, apparatus 900 includes singular elastic band 942, with one end thereof affixed to anchoring pole 912 and the other end thereof affixed to third pole 928. As such, singular elastic band 942 passing through second pole 920 and accommodates the side-by-side storage of anchoring pole 912, second pole 920, and third pole 928. Singular elastic band 942 also facilitates maintenance of the alignment of anchoring pole 912, second pole 920, and third pole 928 when they are in a coverage position. Alternatively, one end of singular elastic band 942 could be affixed to container 902 and the other end thereof could be affixed to retractable canopy 936 passing through anchoring pole 912, second pole 920, and third pole 928. In this configuration, singular elastic band 942 likewise accommodates the side-by-side storage of anchoring pole 912, second pole 920, and third pole 928, while also facilitating the maintenance of the alignment of anchoring pole 912, second pole 920, and third pole 926 when they are in a coverage position.

Similar to the other retractable canopy discussed herein, retractable canopy 936 of apparatus 900 is preferably sized and can be configured to cover, when such is opened, a substantial portion of an area in which the user would be positioned to hand control the movement of the mobile carrier.

Additional Thoughts

The foregoing descriptions of the present invention have been provided for the purposes of illustration and description. It is not intended to be exhaustive or to limit the invention to the precise forms disclosed. Many modifications and variations will be apparent to the practitioner of ordinary skilled in the art. Particularly, it would be evident that while the examples described herein illustrate how the inventive apparatus may look and how the inventive process may be performed. Further, other elements and/or steps may be used for and provide benefits to the present invention. The depictions of the present invention as shown in the exhibits are provided for purposes of illustration.

The embodiments were chosen and described in order to best explain the principles of the invention and its practical application, thereby enabling others of ordinary skill in the art to understand the invention for various embodiments and with various modifications that are suited to the particular use contemplated.

What is claimed:

1. An apparatus, comprising:
   a container with at least one wall and with a first cavity, created by the configuration of such at least one wall, wherein the first cavity is accessible through an outward facing opening in the container, wherein the container is sized to be secured to a mobile carrier where the movement of the mobile carrier is hand controlled by a user and wherein the container has adjacent to the first cavity a second cavity;
   a securing mechanism, attached to the container, capable of locking the container in a fixed position in relation to the portion of the mobile carrier that is in close proximity to the area of the mobile carrier where the user makes hand contact to control the movement of the mobile carrier;
   an anchoring pole with a first end and a second end, where the first end is connected in proximity to an edge and substantially inside of the first cavity by a first hinge; and
   a retractable canopy attached to the second end of the anchoring pole, where the retractable canopy is sized and configurable, when retracted, to fit with the anchoring pole in a storage position within the first cavity and where the retractable canopy can be opened to cover at least a portion of the outward facing opening in the container when the combination of the retractable canopy, with the canopy open, and the anchoring pole are moved to at least one coverage position, with such coverage positions inclusive of a position where the anchoring pole is at a right angle relative to a surface of the container around the opening.

2. The apparatus of claim 1 wherein the container is sized lengthwise to be no longer than the distance between the points of the outer edges of the area of the mobile carrier typically held by two hands.

3. The apparatus of claim 2 wherein the mobile carrier is a stroller for the transportation of a child and such area of the mobile carrier is the space between handles of the stroller.

4. The apparatus of claim 2 wherein the mobile carrier is a wheelchair and such area of the mobile carrier is the space between handles of the wheelchair.

5. The apparatus of claim 1 wherein the securing mechanism comprises a brace connected to the container on one end and connectable to a main structure element of mobile carrier near the portion of the mobile carrier that is held by at least one hand.

6. The apparatus of claim 5 wherein the mobile carrier is a hand-controlled golf bag cart.

7. The apparatus of claim 1 wherein the securing mechanism includes adjustable fasteners.

8. The apparatus of claim 1 further comprising a lid attached to a side of the first cavity, such lid is sized and positioned to cover the first cavity containing the anchoring pole and the retractable canopy therein.

9. The apparatus of claim 1 wherein the second cavity is a cup holder cavity.

10. The apparatus of claim 1 wherein the anchoring pole is telescoping, whereby the retractable canopy can be moved farther away from and closer to the opening of the first cavity where the first end of the anchoring pole is connected to the container.

11. An apparatus, comprising:
    a container with a cavity, wherein the cavity is accessible through an outward facing opening in the container and wherein the container is sized to be secured to a mobile carrier where the movement of the mobile carrier is hand controlled by a user;
    a securing mechanism, attached to the container, capable of locking the container in a fixed position in relation to the portion of the mobile carrier that is in close proximity to the area of the mobile carrier where the user makes hand contact to control the movement of the mobile carrier;
    an anchoring pole with a first end and a second end, where the first end is connected in proximity to an edge and substantially inside of the cavity by a first hinge;
    a second pole with a first end and a second end, where the first end of the second pole is connected to the second end of the anchoring pole by a second hinge;
    a retractable canopy attached to the second end of the second pole, where the retractable canopy is sized and configurable, when retracted, to fit with the anchoring pole and the second pole in a storage position within the cavity and where the retractable canopy can be opened and cover at least a portion of the opening of the container when the combination of the retractable canopy, the anchoring pole and the second pole, with the retractable canopy in position to be opened, are moved to at least one coverage position, with such coverage positions inclusive of a position that is at a right angle relative to a surface of the container around the opening; and wherein the second end of the anchoring pole and the first end of the second pole can be locked in alignment and magnetic material facilities the locking of the alignment.

12. The apparatus of claim 11 further comprising at least one elastic band with one end affixed to the anchoring pole and the other end affixed to the second pole wherein such at least one elastic band accommodates the side-by-side storage of the anchoring pole and the second pole and facilitates maintenance of the alignment of the anchoring pole and the second pole when they are in a coverage position.

13. The apparatus of claim 12 wherein such at least one elastic band is primarily inside of such anchoring pole and such second pole.

14. An apparatus, comprising:
a container with a cavity, wherein the cavity is accessible through an outward facing opening in the container and wherein the container is sized to be secured to a mobile carrier where the movement of the mobile carrier is hand controlled by a user,
a securing mechanism, attached to the container, capable of locking the container in a fixed position in relation to the portion of the mobile carrier that is in close proximity to the area of the mobile carrier where the user makes hand contact to control the movement of the mobile carrier;
an anchoring pole with a first end and a second end, where the first end is connected in proximity to an edge and substantially inside of the cavity by a first hinge;
a second pole with a first end and a second end, where the first end of the second pole is connected to the second end of the anchoring pole by a second hinge;
a third pole with a first end and a second end, where the first end is connected to the second end of the second pole by a third hinge;
a retractable canopy attached to the second end of the third pole, where the retractable canopy is sized and configurable, when retracted, to fit with the anchoring pole, the second pole and the third pole in a storage position within the cavity and where the retractable canopy can be opened and cover at least a portion of the opening of the container when the combination of the retractable canopy, the anchoring pole, the second pole and the third pole, with the retractable canopy in position to be opened, are moved to at least one coverage position, with such coverage positions inclusive of a position that is at a right angle relative to a surface of the container around the opening and where the retractable canopy is sized and can be configured to cover, when such retractable canopy is opened, a substantial portion of the mobile carrier; and wherein the anchoring pole, the second pole, the third pole can be locked in alignment and magnetic material facilities the locking of the alignment.

15. The apparatus of claim 14 further comprising at least one first elastic band with one end affixed to the anchoring pole and the other end affixed to the second pole and at least one second elastic band with one end affixed to the second pole and the other end affixed to the third pole wherein the elastic bands accommodate the side-by-side storage of the anchoring pole, the second pole and the third pole and facilitate maintenance of the alignment of the anchoring pole, the second pole and the third pole when they are in a coverage position.

16. The apparatus of claim 14 further comprising at least one elastic band with one end affixed to the anchoring pole and the other end affixed to the third pole, passing through the second pole, wherein such at least one elastic band accommodates the side-by-side storage of the anchoring pole, the second pole and the third pole and facilitates maintenance of the alignment of the anchoring pole, the second pole and the third pole when they are in a coverage position.

17. The apparatus of claim 14 further comprising at least one elastic band with one end affixed to the container and the other end affixed to the canopy assembly, passing through the anchoring pole, the second pole and the third pole, wherein such at least one elastic band accommodates the side-by-side storage of the anchoring pole, the second pole and the third pole and facilitates the maintenance of the alignment of the anchoring pole, the second pole and the third pole when they are in a coverage position.

18. The apparatus of claim 14 wherein the retractable canopy is sized and can be configured to cover, when such retractable canopy is opened, a substantial portion of an area in which the user would be positioned to hand control the movement of the mobile carrier.

\* \* \* \* \*